United States Patent
Sippel et al.

(10) Patent No.: US 10,458,263 B2
(45) Date of Patent: Oct. 29, 2019

(54) TURBINE SHROUD WITH SEALING FEATURES

(71) Applicants: Rolls-Royce Corporation, Indianapolis, IN (US); Rolls-Royce North American Technologies, Inc., Indianapolis, IN (US)

(72) Inventors: Aaron D. Sippel, Zionsville, IN (US); Ted J. Freeman, Danville, IN (US); David J. Thomas, Brownsburg, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 474 days.

(21) Appl. No.: 15/277,575

(22) Filed: Sep. 27, 2016

(65) Prior Publication Data

US 2017/0101882 A1 Apr. 13, 2017

Related U.S. Application Data

(60) Provisional application No. 62/240,233, filed on Oct. 12, 2015.

(51) Int. Cl.
| | | |
|---|---|---|
| F01D 11/00 | (2006.01) | |
| F01D 11/08 | (2006.01) | |
| F01D 11/18 | (2006.01) | |
| F01D 25/24 | (2006.01) | |
| F01D 25/28 | (2006.01) | |

(52) U.S. Cl.
CPC ............ *F01D 11/005* (2013.01); *F01D 11/18* (2013.01); *F01D 25/246* (2013.01); *F01D 25/28* (2013.01); *F05D 2230/60* (2013.01); *F05D 2240/11* (2013.01); *F05D 2240/55* (2013.01); *F05D 2300/6033* (2013.01); *Y02T 50/672* (2013.01)

(58) Field of Classification Search
CPC ........ F01D 11/005; F01D 11/08; F01D 11/14; F01D 11/18; F01D 25/246; F01D 25/28; F05D 2240/11; F05D 2240/55
See application file for complete search history.

(56) References Cited

U.S. PATENT DOCUMENTS

| | | | |
|---|---|---|---|
| 1,423,466 | A | 7/1922 | Snyder |
| 2,925,290 | A | 2/1960 | Greenwald |
| 3,375,016 | A | 3/1968 | Jellinek et al. |

(Continued)

FOREIGN PATENT DOCUMENTS

| | | | |
|---|---|---|---|
| JP | 5776208 | A | 5/1982 |
| JP | 58176402 | A | 10/1983 |

(Continued)

OTHER PUBLICATIONS

GE Aviation, Jefferies Investor Visit, dated May 12, 2014, 78 pg. (p. 32).

*Primary Examiner* — Woody A Lee, Jr.
*Assistant Examiner* — Christopher R Legendre
(74) *Attorney, Agent, or Firm* — Barnes & Thornburg LLP (57) ABSTRACT

A segmented turbine shroud for positioning radially outside of blades of a turbine rotor includes a carrier, a blade track, and retainers. The blade track is mounted onto the retainers, and the retainers are attached to the carrier to support the blade track radially outside of the blades.

17 Claims, 5 Drawing Sheets

(56) References Cited

U.S. PATENT DOCUMENTS

| | | | |
|---|---|---|---|
| 3,661,197 A | 5/1972 | Peterson | |
| 3,990,813 A | 11/1976 | Imai et al. | |
| 4,635,896 A | 1/1987 | Baker | |
| 5,143,384 A | 9/1992 | Lipschitz | |
| 5,188,506 A | 2/1993 | Creevy | |
| 5,988,975 A | 11/1999 | Pizzi | |
| 6,155,572 A | 12/2000 | Wu et al. | |
| 6,244,599 B1 | 6/2001 | Braun et al. | |
| 6,464,456 B2 | 10/2002 | Darolia et al. | |
| 6,733,235 B2* | 5/2004 | Alford | F01D 11/08 415/173.1 |
| 6,808,363 B2 | 10/2004 | Darkins, Jr. et al. | |
| 6,832,484 B2 | 12/2004 | Hofmann et al. | |
| 6,893,214 B2 | 5/2005 | Alford et al. | |
| 7,080,513 B2 | 7/2006 | Reichert | |
| 7,347,425 B2 | 3/2008 | James | |
| 7,360,769 B2 | 4/2008 | Bennett | |
| 7,374,395 B2 | 5/2008 | Durocher et al. | |
| 7,520,721 B2 | 4/2009 | Hamlin et al. | |
| 7,744,096 B2 | 6/2010 | Kono | |
| 7,771,159 B2 | 8/2010 | Johnson et al. | |
| 7,870,738 B2 | 1/2011 | Zborovsky et al. | |
| 8,047,550 B2 | 11/2011 | Behrens et al. | |
| 8,047,773 B2 | 11/2011 | Bruce et al. | |
| 8,079,600 B2 | 12/2011 | Shojima et al. | |
| 8,157,511 B2 | 4/2012 | Pietrobon et al. | |
| 8,215,645 B1 | 7/2012 | Aho, Jr. | |
| 8,303,245 B2 | 11/2012 | Foster et al. | |
| 8,790,067 B2 | 7/2014 | McCaffrey et al. | |
| 10,047,624 B2* | 8/2018 | O'Leary | F01D 11/005 |
| 10,094,234 B2* | 10/2018 | O'Leary | F01D 11/10 |
| 10,184,352 B2* | 1/2019 | O'Leary | F01D 25/12 |
| 2004/0195783 A1 | 10/2004 | Akagi et al. | |
| 2008/0069688 A1 | 3/2008 | Harper et al. | |
| 2009/0097980 A1 | 4/2009 | Hayasaka et al. | |
| 2012/0070272 A1 | 3/2012 | Prehn | |
| 2012/0171040 A1 | 7/2012 | Walunj et al. | |
| 2013/0156550 A1 | 6/2013 | Franks et al. | |
| 2013/0202433 A1 | 8/2013 | Hafner | |
| 2016/0245108 A1 | 8/2016 | Sippel et al. | |
| 2017/0101882 A1* | 4/2017 | Sippel | F01D 11/08 |

FOREIGN PATENT DOCUMENTS

| | | |
|---|---|---|
| JP | 2000204901 A | 7/2000 |
| WO | 1999031414 A1 | 6/1999 |

* cited by examiner

TURBINE SHROUD WITH SEALING FEATURES

CROSS REFERENCE TO RELATED APPLICATIONS

This application claims priority to and the benefit of U.S. Provisional Patent Application No. 62/240,233, filed 12 Oct. 2015, the disclosure of which is now expressly incorporated herein by reference.

FIELD OF THE DISCLOSURE

The present disclosure relates generally to gas turbine engines, and more specifically to turbine shrouds used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Exhaust products of the combustion reaction in the combustor are directed into the turbine where work is extracted to drive the compressor and, sometimes, an output shaft, fan, or propeller.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds are made up of a number of segments arranged circumferentially adjacent to one another to form a ring. Blade tracks of such shrouds inhibit exhaust gas from leaking through the shroud during operation of the gas turbine engine. Thus, more exhaust gas is directed to the blades of the rotating turbine wheel assembly that extracts work from the gas.

SUMMARY

The present disclosure may comprise one or more of the following features and combinations thereof.

According to the present disclosure, a turbine shroud assembly that extends around a central axis is taught. The assembly may include a carrier segment that extends partway around the central axis and that forms a cavity that opens in a radially-inward direction, a first retainer positioned within the cavity of the carrier segment, the first retainer including at least one attachment post extending radially outward to attach the first retainer to the carrier segment and at least one flange extending radially inward from the attachment post, and a first blade track segment comprising ceramic-containing materials, the first blade track segment formed to include a runner that extends partway around the central axis and the at least one hanger that extends radially outward from the runner into the cavity of the carrier segment to engage at least one flange of the first retainer to mount the first blade track segment thereto.

In some embodiments, the assembly may include a compartment seal. The compartment seal may be disposed to encircle the at least one hanger and engage the runner to seal a portion of the cavity disposed radially outward of the runner of the blade track.

In some embodiments, at least one attachment post of the retainer may be arranged to penetrate through an opening in the carrier segment to attach the retainer to the carrier segment.

In some embodiments, the assembly may include a second blade track segment. The second blade track segment may include a runner that extends partway around the central axis, each of the first and the second blade track segments includes two hangers that extend radially outward from the runner. The compartment seal may encircle the hangers of the first and the second blade track segments, and the compartment seal is disposed in contact with a top surface of the runner.

In some embodiments, the assembly may include a second retainer configured to mount onto the second blade track segment. The first and the second retainers are configured to attach to the carrier segment such that the runners of the two blade track segments are adjacent to each other and define a bottom of the cavity formed by of the carrier segment.

In some embodiments, the flanges of the first retainer may include at least one aftwardly positioned flange for engagement with an aftwardly positioned hanger of the first blade track segment and at least one forwardly positioned flange for engagement with a forwardly positioned hanger of the first blade track segment. Each of the hangers may be formed to have an L-shape cross section including a radially extending portion and a forwardly extending portion.

In some embodiments, the carrier segment may include a carrier body, first and second circumferential endwalls, and first and second axial endwalls, and wherein each of the endwalls have an end seal recess disposed on a circumferentially outer side thereof. Each of the endwalls may extend radially inward from the carrier body. Each of the endwalls may have a radially inner end having a recess disposed therein sized to receive a compartment seal.

In some embodiments, the carrier segment may include a middle wall having a radially inner end that forms at least two recess disposed therein. Each recess of the middle wall may be sized to receive a compartment seal.

In some embodiments, the assembly may include a second blade track segment and a gap seal. The second blade track segment may include a runner that extends partway around the central axis and at least one hanger that extends radially outward from the runner. The gap seal may extend in the axial direction and may be arranged between the adjacent runners of the two blade track segments. The two blade track segments may cooperate to define recesses formed by features in a radially outer sides of the runners that receives the gap seal to provide sealing between the adjacent runners of the blade track segments.

According to another aspect of the present disclosure, a turbine shroud assembly that extends at least partway around a central axis is taught. The assembly may include a carrier segment comprising metallic materials and a first blade track segment comprising ceramic-matrix composite materials. The carrier may be formed to include a radially-inwardly opening cavity. The first blade track segment may be formed to include a runner that extends partway around the central axis and an attachment feature that extends outward in the radial direction from the runner into the radially-inwardly opening cavity of the carrier segment.

In some embodiments, the assembly may include a compartment seal. The compartment seal may extend around the attachment feature and may engage a radially-outward facing surface of the runner to seal at least a portion of the radially-inwardly opening cavity from gasses outside the radially-inwardly opening cavity.

In some embodiments, the compartment seal may be a one-piece component. The compartment seal may form an uninterrupted ring as it extends around the attachment feature. The compartment seal may be formed to include a plurality of radially-expandable folds configured to allow radial expansion and contraction of the compartment seal to accommodate thermal growth and contraction of the carrier segment and the first blade track segment.

In some embodiments, the carrier segment may include a carrier body, a first and second circumferential and walls that extend inward in the radial direction from circumferential ends of the carrier body, and first and second axial endwalls that extend inward in the radial direction from axial ends of the carrier body. Each of the first and second circumferential endwalls and the first and the second axial endwalls may be formed to include a radially-inwardly opening recess that each receive a portion of the compartment seal. In some embodiments, the radially-inwardly opening recesses cooperate to form an uninterrupted ring around the attachment feature.

In some embodiments, the assembly may include a second blade track segment. The second blade track segment may include a runner that extends partway around the central axis and an attachment feature that extends outward in the radial direction from the runner into the radially-inwardly opening cavity of the carrier segment. Chamfers along radially-outwardly facing circumferential ends of the runners included in the first blade track segment and the second blade track segment may cooperate to form radially-outwardly opening channel that receives a gap seal sized to seal a circumferential gap between the first blade track segment and the second blade track segment.

In some embodiments, the compartment seal may be a one-piece component extends around the attachment feature of the second blade track segment to form a ring around the attachment features of both the first blade track segment and the second blade track segment.

According to another aspect of the present disclosure, a method of assembling a segmented turbine shroud that extends around a central axis is taught. The method may include mounting a retainer formed to include flanges to a blade track segment formed to include a runner, hangers, and attachment posts so that the flanges engage the hangers and attaching the retainer to a carrier segment by coupling an attachment post of the retainer to the carrier segment so that the retainer and the hangers are received in a radially inwardly-opening cavity formed by a carrier segment.

In some embodiments, the method may include positioning at least one compartment seal in a recess of the carrier segment to engage a radially outer side of the runner of the blade track segment to seal the radially inwardly-opening cavity.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
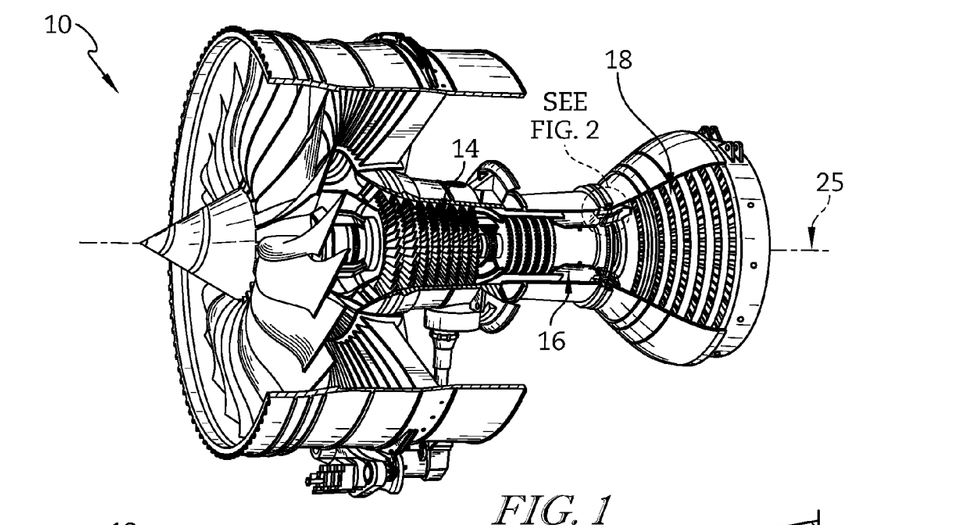
FIG. 1 is a perspective view of a gas turbine assembly according to the present disclosure with a portion cut away to show that the assembly includes a compressor, a combustor, and a turbine with a segmented turbine shroud detailed in FIGS. 2 and 3.

An illustrative gas turbine engine 10 with a portion cut away is shown in FIG. 1 to illustrate that the engine 10 includes a compressor 14, a combustor 16, and a turbine 18. The compressor 14 compresses and delivers air to the combustor 16. The combustor 16 mixes fuel with the compressed air from the compressor 14 and combusts the mixture. The hot, high-pressure exhaust products of the combustion reaction in the combustor 16 are directed into the turbine 18 to cause the turbine blade 20 to rotate about an axis 25 and drive the compressor 14.

Figure 2:
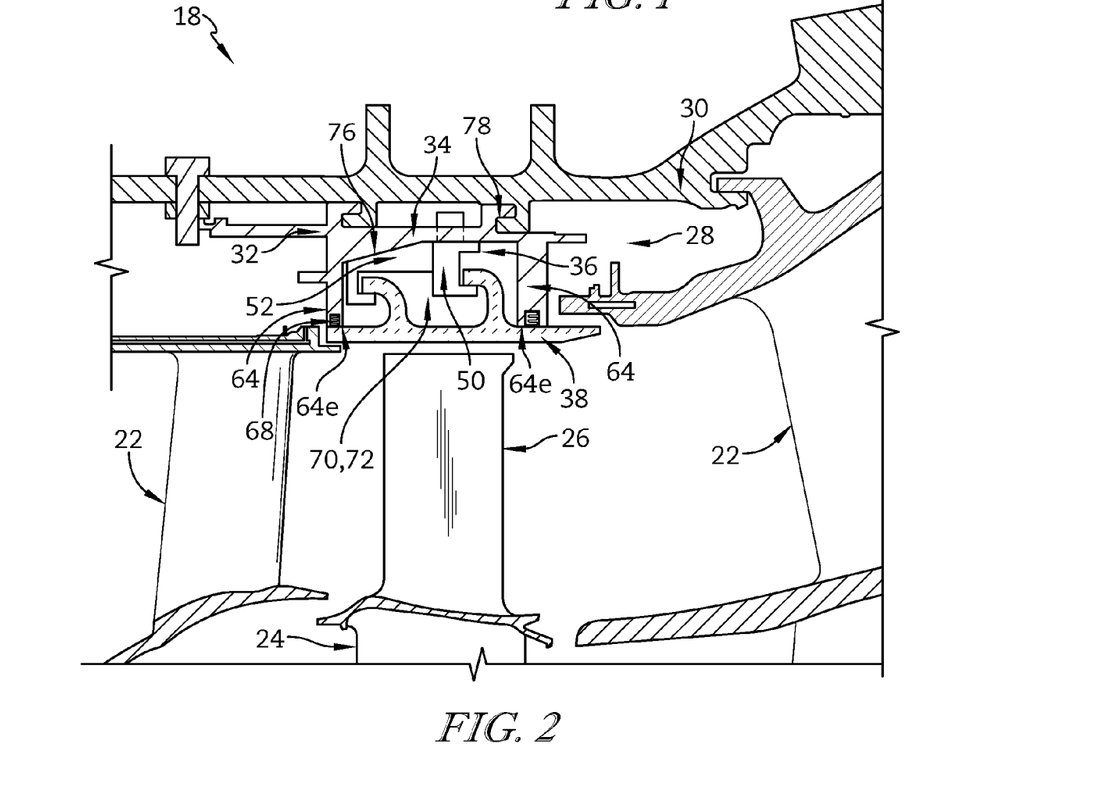
FIG. 2 is a cross-sectional view of a portion of the turbine shown in FIG. 1 showing that the segmented turbine shroud includes a carrier segment that forms a radially inwardly-opening cavity, a retainer that attaches to the carrier segment and is arranged within the cavity, a blade track segment mounted onto the retainer to couple the blade track segment to the carrier segment, and a compartment seal that seals between the carrier segment and the blade track segment.

Referring now to FIG. 2, a portion of the turbine 18 is shown to include static turbine vane assembly 22 and a turbine wheel assembly 24. The vane assembly 22 extends across the flow path of the hot, high-pressure exhaust gas from the combustor 16 to direct the exhaust toward blades 26 of the turbine wheel assembly 24. The flow of combustion exhaust gas applies force to the blades 26 to cause the turbine wheel assembly 24 to rotate, thereby driving the rotating components of the compressor 14. A segmented turbine shroud 28 extends circumferentially around axis 25 of the turbine wheel assembly 24 to encourage combustion exhaust to flow in a manner that applies force to the blades as suggested in FIG. 2.

Figure 3:
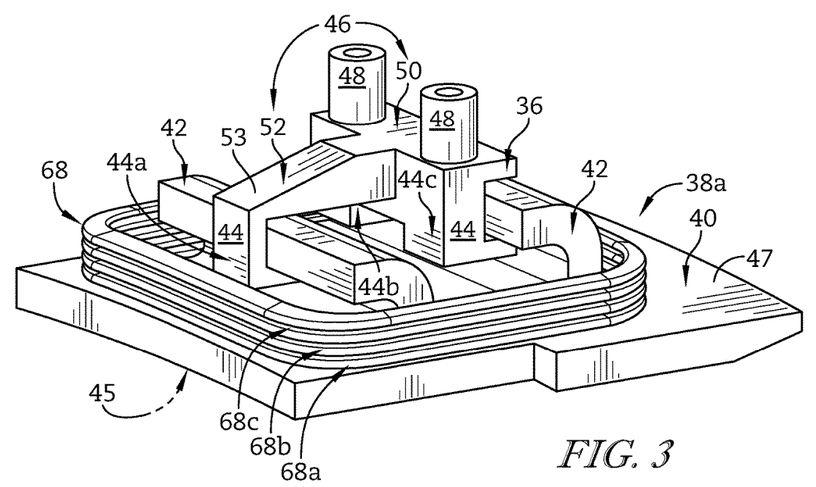
FIG. 3 is a perspective view of a portion of an illustrative embodiment of the segmented turbine shroud segment of the turbine shroud of FIG. 2 showing that the blade track segment mounts onto the retainer by engagement between hangers of the blade track and flanges of the retainer, and showing that the compartment seal is disposed around the hangers of each of the blade track segments and in contact with a top side of the blade track segment.
Figure 4:
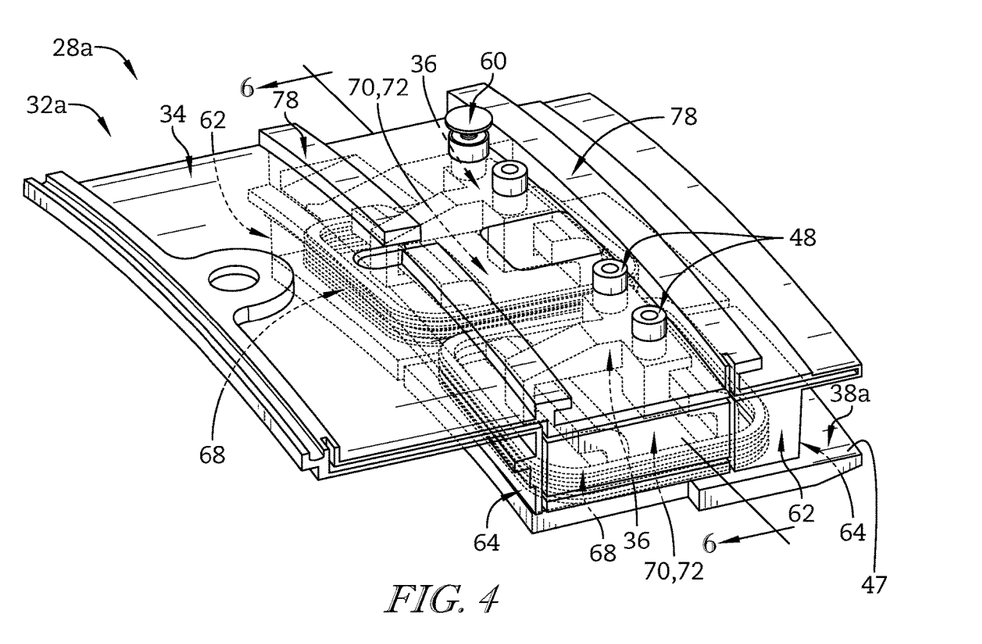
FIG. 4 is a cross-sectional view of an illustrative embodiment of the segmented turbine shroud of FIGS. 2 and 3 showing that the carrier segment is coupled to support multiple blade track segments that are each mounted onto retainers (shown in phantom), and showing that the retainers attach to the carrier segment by attachment posts that penetrate through openings in the carrier segment, and further showing that the carrier segment and one blade track segment are coupled together along with a compartment seal to form a sealed cavity within the carrier.
Figure 5:
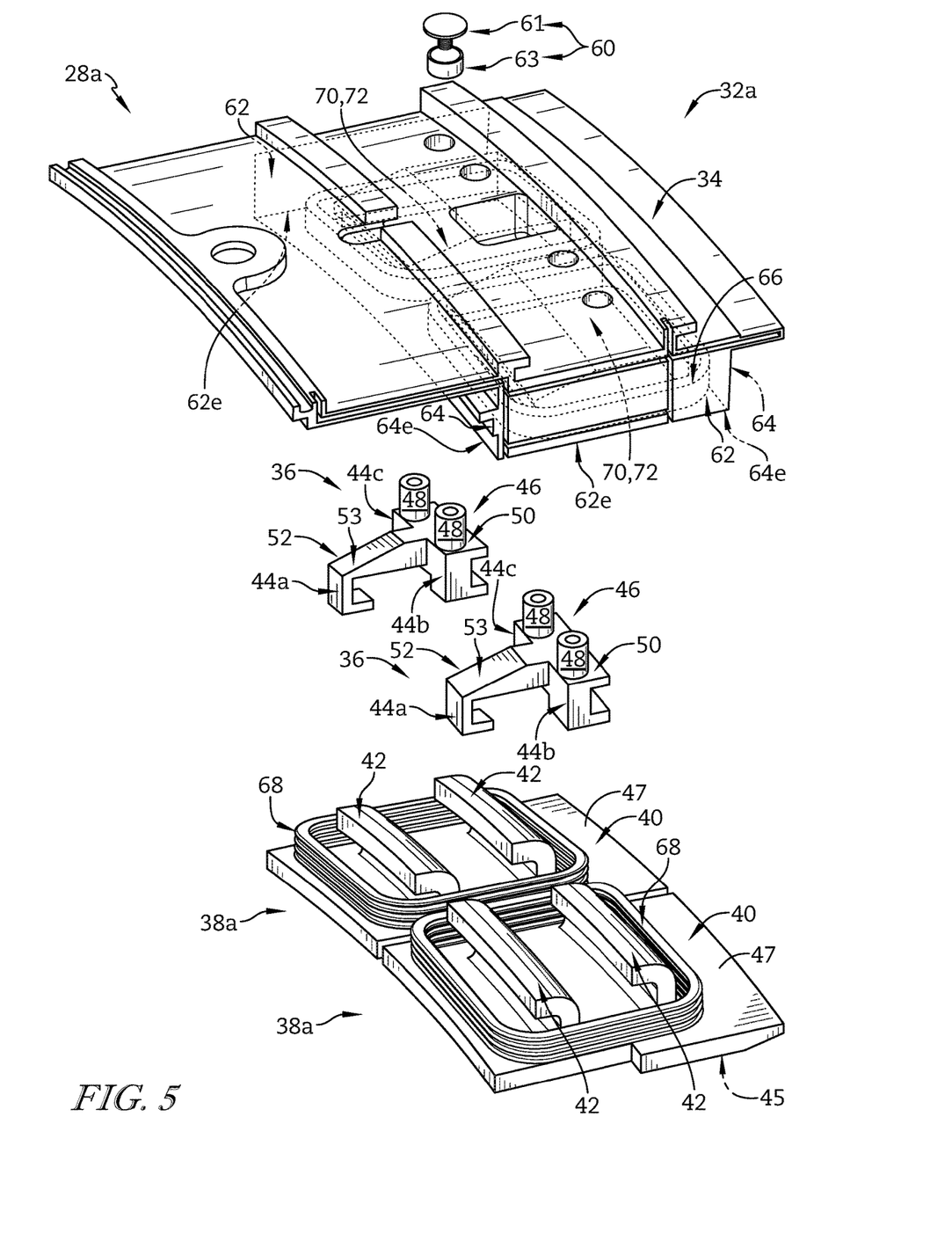
FIG. 5 is an exploded perspective view the illustrative embodiment of the segmented turbine shroud of FIG. 4 showing the details of the carrier segment, the retainers, and the blade tracks segments.

Turbine shroud 28 illustratively includes a carrier 32, a blade track 38, and retainers 36 as shown in FIGS. 2-4. Carrier 32 illustratively supports blade track 38 through retainers 36 as suggested in FIGS. 2 and 4. Turbine shroud 28, carrier 32, and blade track 38 are each illustratively comprised of a respective plurality of turbine shroud segments 28a, carrier segments 32a, and blade track segments 38a. Each of turbine shroud segments 28a, carrier segments 32a, and turbine shroud segments 38a are arranged within a case 30 to form respective annular rings as suggested in FIGS. 1 and 2. In illustrative embodiments as shown in FIGS. 4 and 5, each turbine shroud segment 28a may comprise one carrier segment 32a attached to two retainers 36 and two blade track segments 38a each mounted to one of retainers 36.

Carrier segment 32a comprises metallic materials and illustratively supports blade track segment 38a through retainers 36 as suggested in FIGS. 2 and 4. In the illustrative embodiment 4, each blade track segment 38a of the blade track 38 mounts onto a retainer 36, and retainers 36 illustratively attach to carrier segment 32a as shown in FIG. 3. The carrier segment 32a and each blade track segment 38a are illustratively arranged with a compartment seal 68 disposed to close a radially inwardly-opening cavity 70 of the carrier segment 32a to form a sealed compartment 72. Carrier segment 32a illustratively attaches to case 30 to support blade track segment 38a for arrangement radially outward of blades 26 as suggested in FIG. 2.

Blade track segment 38a of blade track 38 includes a runner 40 and hangers 42 as suggested in the illustrative embodiment shown in FIG. 3. Blade track segment 38a is illustratively formed of ceramic matrix composite (CMC) material. In some embodiments, the CMC materials may include one or more of silicon carbide and oxides of aluminum. In some embodiments, blade track segment 38a may include any material suitable for gas turbine engine operation, such as aluminum alloy. Runner 40 includes a flow surface 45 on a radially inner side thereof for directing combustion exhaust flow towards the blades 26, and an upper surface 47 that is configured to contact compartment seal 68 to form sealed compartment 72. Blade track segment 38a includes hangers 42 extending radially outward from upper surface 47.

Hangers 42 are configured to engage retainer 36 to mount blade track segment 38a to retainer 36 as suggested in FIG. 3. In illustrative embodiments, hangers 42 have an L-shape and extend radially outward from the runner 40 for a distance before extending for a distance in the forward direction of the gas turbine engine 10 as suggested in FIGS. 2-3. In some embodiments, hangers 42 may have any shape suitable for mounting blade track 38 to retainer 36, such as extending for a distance in the circumferential direction of the gas turbine engine 10. Hangers 42 engage with flanges 44 of retainer 36 to mount blade track segment 38a to retainer 36.

Each retainer 36 includes a retainer body 46, attachment posts 48, and flanges 44 as suggested in FIGS. 2-4. Retainer body 46 is illustratively formed of a block 50 having an arm 52 attached to a forward side of block 50. Arm 52 extends in the forward direction from the forward side of block 50 and includes a sloped top surface 53 that decreases in radial height progressively along at least a portion of its extension in the forward direction. Attachment posts 48 illustratively extend radially outward from the retainer body 46 for connection with the carrier segment 32a.

Attachment posts 48 of retainer 36 illustratively extend radially outward from block 50 of the retainer body 46 for connection with carrier segment 32a as illustratively suggested in FIGS. 2 and 3. In illustrative embodiments, attachment posts 48 are cylinders that extend along the radial direction of gas turbine engine 10. In some embodiments, attachment posts 48 may have any shape suitable for connection with carrier body 34 to support blade track 38. In illustrative embodiments, each attachment post 48 penetrates through an opening 54 of a carrier body 34 of carrier segment 32a to attach the retainer 36 to the carrier 32.

Attachment posts 48 each illustratively have a top end 56 that extends above the carrier body 34. Each top end 56 is illustratively configured for engagement with fasteners 60 to prevent removal of attachment posts 48 from their respective openings 54 as shown in FIGS. 4 and 5. Each fastener 60 is illustratively embodied as a bolt 61 having a spacer 63 sized to prevent removal of attachment posts 48 from openings 54 as suggested in FIGS. 4 and 5. In some embodiments, fasteners 60 may include any suitable type of fasteners such as shear pins that penetrate through the attachment posts perpendicular to the radial direction of gas turbine engine 10. In some embodiments, attachment posts 48 may be attached to carrier segment 32a by any suitable manner including but not limited to bonding, welding, fastening, press fitting, etc.

Flanges 44 of each retainer 36 illustratively extend radially inward from retainer body 46 for engagement with blade track 38 as suggested in FIGS. 2-5. Flanges 44 are illustratively shaped complimentary to hangers 42 and extend radially inward for a distance before extending in the aftward direction of gas turbine engine 10 for a distance as suggested in FIGS. 2-3. In illustrative embodiments, each retainer 36 includes first, second, and third flanges 44a, 44b, 44c extending radially inward from the retainer body 46 to provide three points of contact with the blade track segment thereby locating the blade track segment in three dimensions, as suggested in FIG. 3.

First flange 44a is illustratively connected to arm 52 of retainer body 46 and is arranged to engage one of the hangers 42 of one blade track segment 38a. Second flange 44b and third flange 44c are illustratively connected to the block 50 of the retainer body 46 and are arranged to engage another of the hangers 42 of the same blade track segment 38*a*. Second and third flanges 44*b*, 44*c* are illustratively arranged in circumferentially spaced apart relation at opposite circumferential ends of block 50 as shown in FIGS. 3-5.

Carrier segment 32*a* includes carrier body 34, middle wall 67, and end walls 62, 64 as illustrated in FIGS. 2 and 4-6. Carrier body 34 illustratively includes hangers 78 configured to engage the casing 30 to attach the carrier segment 32*a* to the casing 30. Carrier body 34 illustratively includes a radially inner surface 76 that is sloped complimentary to the slope of top surface 53 of arm 52 of retainer 36 and is configured for contact therewith.

Figure 6:
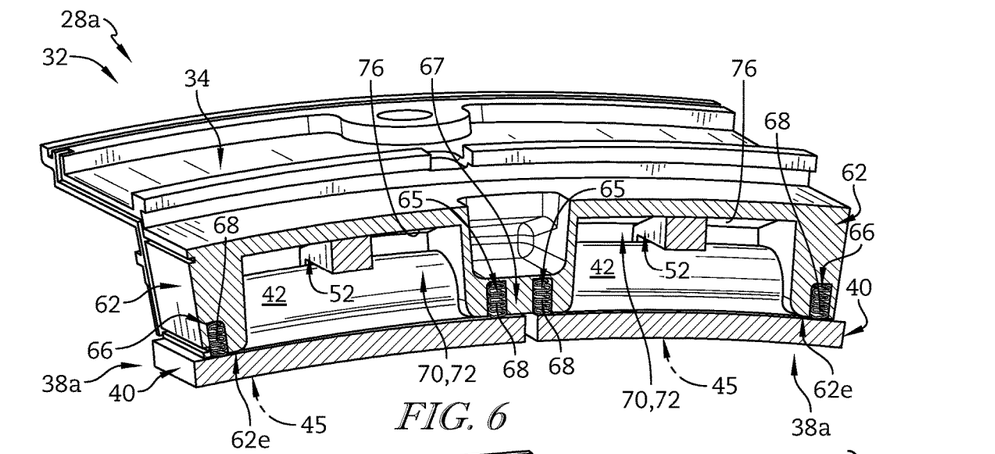
FIG. 6 is a detailed cross-sectional view of the illustrative embodiment of the segmented turbine shroud of FIG. 4 taken along the line 6-6 and showing that the compartment seal of the blade track segment is disposed within recesses of endwalls of the carrier segment and within a recess of a middle wall of the carrier segment and is disposed in contact with the top surface of the blade track segment to form a sealed compartment between the runner and the radially inwardly-opening cavity.

Middle wall 67 extends radially inward from the carrier body 34 to a middle wall end as shown in FIG. 6. Middle wall 67 illustratively includes two recesses 65 defined therein. Each recess 65 is configured to receive a portion of one compartment seal 68 for contact with an upper surface 47 of blade track segment 38*a* as shown in FIG. 6.

End walls 62, 64 include circumferential end walls 62, and axial end walls 64. End walls 62, 64 extend radially inward from the carrier body 34 to radially inward ends 62*e*, 64*e* thereof and define radially inwardly-opening cavity 70 as suggested in FIGS. 5 and 6. Radially inward ends 62*e*, 64*e* of the respective end walls 62, 64 include recesses 66 defined therein and configured to receive compartment seal 68 for contact with an upper surface 47 of blade track segment 38*a*. Carrier segment 32*a* is illustratively coupled to blade track segment 38*a* with compartment seal 68 disposed in the recesses 66 of end walls 62, 64 and in recess 65 of middle wall 67, with the compartment seal 68 in contact with upper surface 47 of blade track segment 38*a* to close radially inwardly-opening cavity 70 and form sealed compartment 72.

The compartment seal 68 illustratively seals off the compartment 72 from gasses outside the compartment 72 as suggested in FIGS. 2 and 3. The compartment seal 68 extends around the attachment features 42 of the blade track segment 38*a*. Illustratively, the compartment seal 68 is a one-piece metallic component that forms an uninterrupted ring around the attachment feature 42 as suggested in FIG. 3. The compartment seal 68 is formed to include radially-expandable folds 68*a*, 68*b*, 68*c* as shown in FIG. 3. The folds 68*a*, 68*b*, 68*c* allow radial expansion and contraction of the compartment seal 68 to accommodate thermal growth and contraction of the turbine shroud 28.

Figure 7:
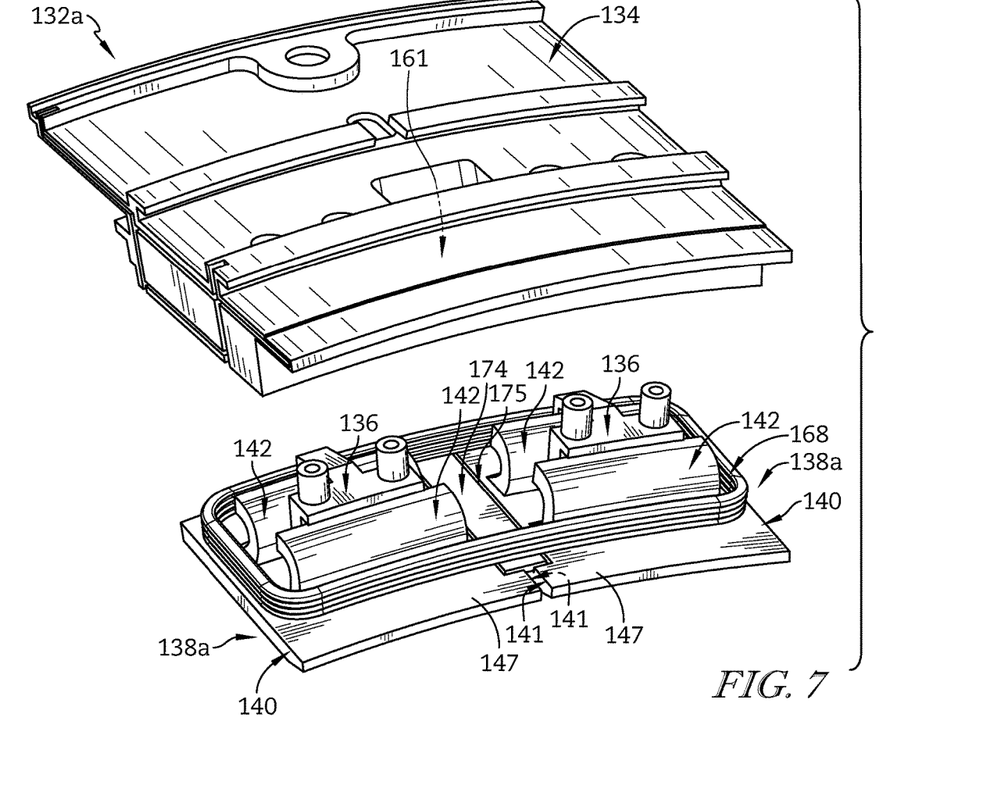
FIG. 7 is a perspective view of a segmented portion of another illustrative embodiment of the turbine shroud of FIG. 2 showing that the blade track includes a single compartment seal that is disposed about two adjacent blade track segments, and a strip seal positioned between the adjacent blade track segments and within a seal recess defined partly within the top surface and a circumferentially interior end side of each the adjacent blade track segments for discouraging combustion gases from flowing between the blade track segments.

Referring now to a second illustrative embodiment shown in FIG. 7, a segmented turbine shroud 128 includes a carrier segment 132*a*, blade track segments 138*a*, and retainers 136. Segmented turbine shroud 128 is configured for use in engine 10 and is substantially similar to the turbine shroud 28 shown in FIGS. 1-6 and described herein. Accordingly, similar reference numbers in the 100 series indicate features that are common between the turbine shroud 28 and turbine shroud 128 unless indicated otherwise. The description of segmented turbine shroud 28 is hereby incorporated by reference to apply to segmented turbine shroud 128 except in instances when it conflicts with the specific description and drawings of segmented turbine shroud 128.

Unlike segmented turbine shroud 28, segmented turbine shroud 128 includes a single compartment seal 168 arranged to encircle hangers 142 of both of the blade track segments 138*a*. Also, unlike segmented turbine shroud 28, runners 140 of blade track segments 138*a* of segmented turbine shroud 128 define a seal recess 175 at a circumferentially interior end side 141 and a top surface 147 of the runners 140. Each circumferentially interior end side 141 is positioned adjacent to and directly facing the circumferentially interior end side 141 of the other runner 140. Seal recess 175 is at least partly defined within the top surface 147 and circumferentially interior side 141 of each runner 140 of the segmented turbine shroud 128.

Seal recess 175 is configured to receive a gap seal 174 in sealing arrangement with the blade track segments 138*a* to discourage passage of exhaust gases between the runners 140. Gap seal 174 is illustratively embodied as a strip seal having generally flat radially inner and outer surfaces as shown in FIG. 7. In some embodiments, gap seal 174 may contact the compartment seal 168 and or a middle wall 161 of the carrier segment 132*a*. The compartment seal 168 and the gap seal 174 are arranged with carrier segment 132*a* and blade track segments 138*a* to form a sealed compartment 172 and to encourage combustion exhaust to flow in a manner that applies force to the blades 26 of engine 10.

In a third illustrative embodiment, a segmented turbine shroud 228 includes a carrier segment 232*a*, blade track segments 238*a*, and retainers 236. Segmented turbine shrouds 228 is configured for use in engine 10 and is substantially similar to segmented turbine shrouds 28 and 128 shown in FIGS. 1-7 and described herein. Accordingly, similar reference numbers in the 200 series indicate features that are common between segmented turbine shrouds 28, 128 and the turbine shroud 228 unless indicated otherwise. The description of segmented turbine shrouds 28, 128 is hereby incorporated by reference to apply to segmented turbine shrouds 228 except in instances when it conflicts with the specific description and drawings of segmented turbine shroud 228.

Figure 8:
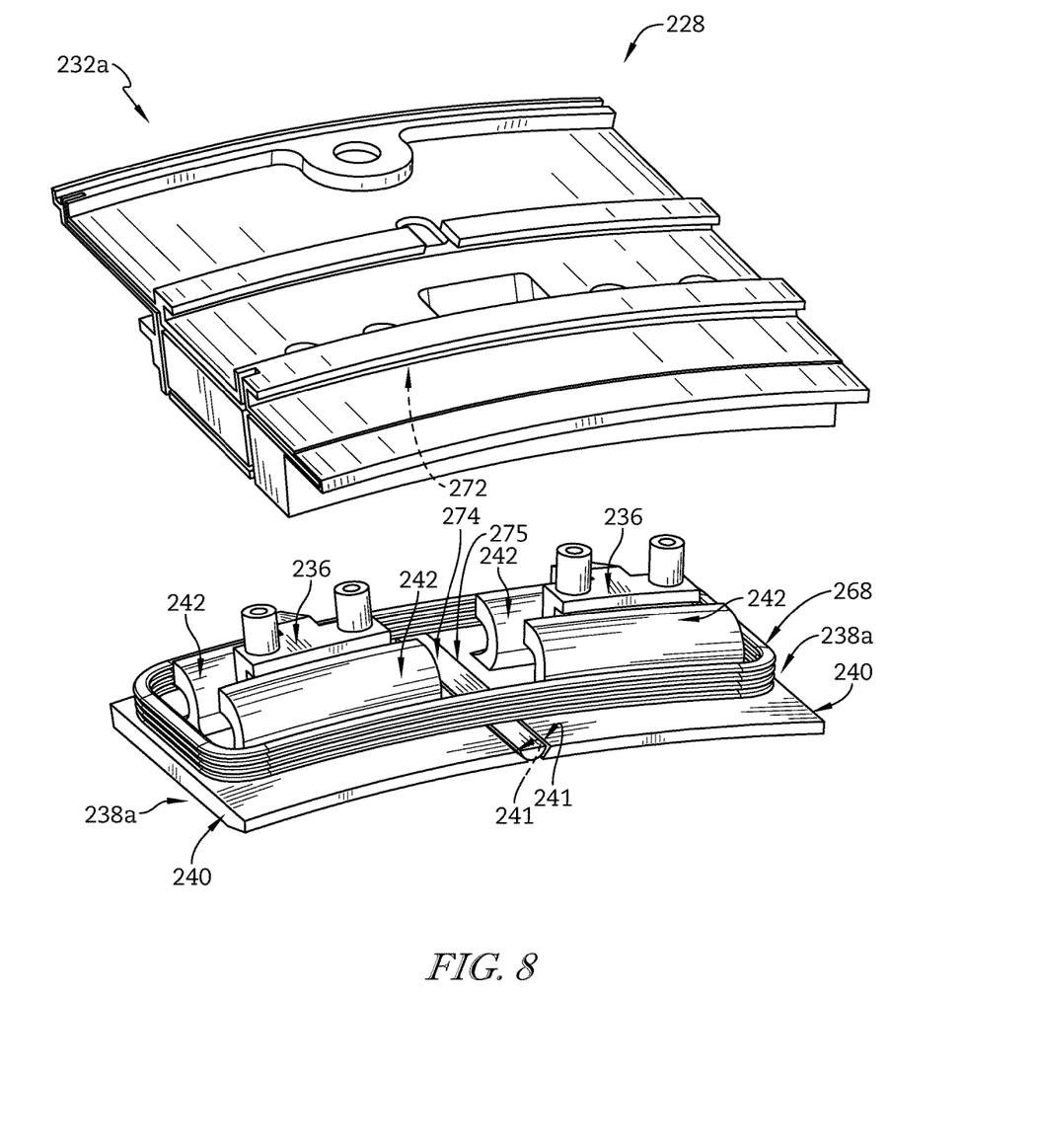
FIG. 8 is a perspective view of a segmented portion of another illustrative embodiment of the turbine shroud of FIG. 7 showing that the blade track includes a single compartment seal that is disposed about two adjacent blade track segments, and a rod seal that is positioned between the adjacent blade track segments that together define a seal recess formed by adjacent sloped interior circumferential end sides to receive the rod seal for discouraging combustion gases from flowing between the blade track segments.

Unlike the segmented turbine shroud 28, but similar to segmented turbine shroud 128, segmented turbine shroud 228 includes a single compartment seal 268 arranged to encircle hangers 242 of both of the blade track segments 238*a*.

Unlike both segmented turbine shrouds 28, 128, blade track segments 238*a* include runners 240 having sloped or chamfered circumferentially interior end sides 241 positioned adjacent to and partly facing the circumferentially interior end side 241 of the other runner 140, but being sloped in the radially outward direction. Sloped interior end sides 241 together define a seal recess 275 configured to receive a gap seal 274. Unlike the segmented turbine shroud 128, circumferentially interior end sides 241 of runners 240 are slanted to face at least partially radially outward to form seal recess or channel 275. Seal recess 275 is configured to receive a portion of rod seal 274 to prevent passage of exhaust gases between the runners 240 of the blade track segments 238*a*.

The compartment seal 268 and gap seal 274 are arranged with carrier segment 232*a* and blade track segments 238*a* to form a seal compartment 272 and to encourage combustion exhaust to flow in a manner that applies force to the blades 26 of engine 10. Unlike segmented turbine shroud 128, the gap seal 274 is illustratively embodied as a half rod seal having an arcuate shape on a radially inner side of its cross-section. In some embodiments, gap seal 228 may have any shape of cross-section suitable to discourage passage of exhaust gases between the runners 240, for example a circular cross-section.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly that extends around a central axis, the assembly comprising
a carrier segment that extends partway around the central axis and that forms a cavity that opens in a radially-inward direction,
a first retainer positioned within the cavity of the carrier segment, the first retainer including at least one attachment post extending radially outward to attach the first retainer to the carrier segment and at least one flange extending radially inward from the attachment post,
a first blade track segment comprising ceramic-containing materials, the first blade track segment formed to include a runner that extends partway around the central axis and at least one hanger that extends radially outward from the runner into the cavity of the carrier segment to engage the at least one flange of the first retainer to mount the first blade track segment thereto, and
a compartment seal disposed to encircle the at least one hanger and engage the runner to seal a portion of the cavity disposed radially outward of the runner of the first blade track segment,
wherein the at least one flange of the first retainer includes at least one aftwardly positioned flange for engagement with an aftwardly positioned hanger included in the at least one hanger of the first blade track segment and at least one forwardly positioned flange for engagement with a forwardly positioned hanger included in the at least one hanger of the first blade track segment.

2. The assembly of claim 1, wherein the at least one attachment post of the first retainer is arranged to penetrate through an opening in the carrier segment to attach the first retainer to the carrier segment.

3. The assembly of claim 1, further comprising a second blade track segment including a runner that extends partway around the central axis and two hangers that extend radially outward from the runner of the second blade track segment, the compartment seal encircles the hangers of the first and the second blade track segments, and the compartment seal is disposed in contact with a top surface of the runner of the first blade track segment and the runner of the second blade track segment.

4. The assembly of claim 3, further comprising a second retainer configured to mount onto the second blade track segment, and the first and the second retainers are configured to attach to the carrier segment such that the runners of the first and second blade track segments are adjacent to each other and define a bottom of the cavity formed by the carrier segment.

5. The assembly of claim 1, wherein each of the hangers included in the at least one hanger is formed to have an L-shape cross section including a radially extending portion and a forwardly extending portion.

6. The assembly of claim 1, wherein the carrier segment includes a carrier body, first and second circumferential endwalls, and first and second axial endwalls, and wherein each of the first and second circumferential endwalls and the first and second axial endwalls have an end seal recess that opens radially inwardly disposed therein, and wherein each of the first and second circumferential endwalls and the first and second axial endwalls extend radially inward from the carrier body.

7. The assembly of claim 6, wherein the carrier segment includes a middle wall having a radially inner end with at least two radially-inwardly opening recesses disposed therein.

8. The assembly of claim 1, further comprising a second blade track segment and a gap seal, the second blade track segment including a runner that extends partway around the central axis and at least one hanger that extends radially outward from the runner, the gap seal extending in the axial direction and arranged between the runners of the first and second blade track segments, and the first and second blade track segments cooperate to define a recess that receives the gap seal to provide sealing between the runners of the first and second blade track segments.

9. A turbine shroud assembly that extends at least partway around a central axis, the assembly comprising
a carrier segment comprising metallic materials, the carrier segment formed to include a radially-inwardly opening cavity,
a first blade track segment comprising ceramic-matrix composite materials, the first blade track segment formed to include a runner that extends partway around the central axis and an attachment feature that extends outward in the radial direction from the runner into the radially-inwardly opening cavity of the carrier segment, and
a compartment seal that extends around the attachment feature and engages a radially-outward facing surface of the runner to seal at least a portion of the radially-inwardly opening cavity from gasses outside the radially-inwardly opening cavity,
wherein the compartment seal is formed to include a plurality of radially-expandable folds configured to allow radial expansion and contraction of the compartment seal to accommodate thermal growth and contraction of the carrier segment and the first blade track segment.

10. The assembly of claim 9, wherein the compartment seal is a one-piece component.

11. The assembly of claim 10, wherein the compartment seal forms an uninterrupted ring as it extends around the attachment feature.

12. The assembly of claim 9, wherein the carrier segment includes a carrier body, first and second circumferential endwalls that extend inward in the radial direction from circumferential ends of the carrier body, and first and second axial endwalls that extend inward in the radial direction from axial ends of the carrier body; and
wherein each of the first and second circumferential endwalls and the first and second axial endwalls are formed to include a radially-inwardly opening recess that each receive a portion of the compartment seal.

13. The assembly of claim 12, wherein the radially-inwardly opening recesses cooperate to form an uninterrupted ring around the attachment feature.

14. A turbine shroud assembly that extends at least partway around a central axis, the assembly comprising
a carrier segment comprising metallic materials, the carrier segment formed to include a radially-inwardly opening cavity,
a first blade track segment comprising ceramic-matrix composite materials, the first blade track segment formed to include a runner that extends partway around the central axis and an attachment feature that extends outward in the radial direction from the runner into the radially-inwardly opening cavity of the carrier segment, and a compartment seal that extends around the attachment feature and engages a radially-outward facing surface of the runner to seal at least a portion of the radially-inwardly opening cavity from gasses outside the radially-inwardly opening cavity, further comprising a second blade track segment including: a runner that extends partway around the central axis and an attachment feature that extends outward in the radial direction from the runner into the radially-inwardly opening cavity of the carrier segment.

15. The assembly of claim 14, wherein chamfers along circumferential ends of the runners included in the first blade track segment and the second blade track segment cooperate to form a radially-outwardly opening channel that receives a gap seal sized to seal a circumferential gap between the first blade track segment and the second blade track segment.

16. The assembly of claim 14, wherein the compartment seal is a one-piece component that extends around the attachment feature of the second blade track segment to form a ring around the attachment features of both the first blade track segment and the second blade track segment.

17. A method of assembling a segmented turbine shroud that extends around a central axis, the method comprising
mounting a retainer formed to include flanges and attachment posts to a blade track segment formed to include a runner and hangers so that the flanges engage the hangers,
attaching the retainer to a carrier segment by coupling the attachment posts of the retainer to the carrier segment so that the retainer and the hangers are received in a radially inwardly-opening cavity formed by the carrier segment, and
positioning at least one compartment seal in a recess of the carrier segment to engage a radially outer side of the runner of the blade track segment to seal the radially inwardly-opening cavity.

* * * * *